(12) United States Patent
Kodama (10) Patent No.: US 12,047,685 B2
(45) Date of Patent: Jul. 23, 2024

(54) IMAGING APPARATUS AND CONTROL METHOD THEREFOR

(71) Applicant: SONY SEMICONDUCTOR SOLUTIONS CORPORATION, Kanagawa (JP)

(72) Inventor: Kazutoshi Kodama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/906,981

(22) PCT Filed: Feb. 3, 2021

(86) PCT No.: PCT/JP2021/003902
§ 371 (c)(1),
(2) Date: Sep. 22, 2022

(87) PCT Pub. No.: WO2021/199658
PCT Pub. Date: Oct. 7, 2021

(65) Prior Publication Data
US 2023/0119596 A1    Apr. 20, 2023

(30) Foreign Application Priority Data
Mar. 31, 2020  (JP) ................. 2020-061951

(51) Int. Cl.
*H04N 23/73* (2023.01)
*H04N 25/772* (2023.01)

(52) U.S. Cl.
CPC ........... *H04N 23/73* (2023.01); *H04N 25/772* (2023.01)

(58) Field of Classification Search
CPC ............................ H04N 23/73; H04N 25/772
See application file for complete search history.

(56) References Cited

U.S. PATENT DOCUMENTS 6,466,265 B1    10/2002 Lee
2005/0270401 A1*  12/2005 Hatano ............... H04N 23/667
                                                      348/335

(Continued)

FOREIGN PATENT DOCUMENTS

EP        3624441 A1     3/2020
JP     2012-010074 A     1/2012

(Continued)

OTHER PUBLICATIONS

International Search Report and Written Opinion of PCT Application No. PCT/JP2021/003902, issued on Apr. 20, 2021, 09 pages of ISRWO.

*Primary Examiner* — Jason A Flohre
(74) *Attorney, Agent, or Firm* — CHIP LAW GROUP (57) ABSTRACT

To improve the frame rate in an imaging apparatus that carries out still image recording and moving image display simultaneously. A pixel array includes an arrangement of a plurality of pixels. The plurality of pixels each include an internal memory. An exposure control unit carries out first exposure control in which captured data obtained by performing exposure to all the plurality of pixels together is retained in the internal memories of the pixels. The exposure control unit also carries out second exposure control in which captured data obtained by performing exposure to specific pixels of the plurality of pixels together is retained in the internal memories of the pixels.

11 Claims, 11 Drawing Sheets

(56) References Cited

U.S. PATENT DOCUMENTS

| | | | |
|---|---|---|---|
| 2006/0243883 A1* | 11/2006 | Yahazu | H04N 25/616 |
| | | | 348/E3.02 |
| 2007/0153109 A1* | 7/2007 | Lule | H04N 25/42 |
| | | | 348/E3.019 |
| 2008/0180555 A1* | 7/2008 | Sato | H04N 25/441 |
| | | | 348/E3.019 |
| 2009/0244344 A1 | 10/2009 | Takayanagi | |
| 2011/0298954 A1* | 12/2011 | Nakaseko | H04N 23/73 |
| | | | 348/E5.091 |
| 2012/0044398 A1 | 2/2012 | Chou | |
| 2017/0006238 A1 | 1/2017 | Kenzaburo | |
| 2017/0104946 A1 | 4/2017 | Hong | |
| 2017/0195603 A1* | 7/2017 | Kawazu | H04N 25/772 |
| 2017/0366774 A1* | 12/2017 | Feng | H01L 27/14645 |
| 2018/0007287 A1 | 1/2018 | Takenaka | |
| 2018/0063459 A1* | 3/2018 | Stark | H01L 27/14643 |
| 2019/0288023 A1* | 9/2019 | Raynor | H04N 25/65 |
| 2020/0014859 A1 | 1/2020 | Masuda | |
| 2020/0186710 A1* | 6/2020 | Sheikh | H04N 23/65 |
| 2020/0358953 A1* | 11/2020 | Ito | H04N 1/212 |
| 2021/0281794 A1* | 9/2021 | Yoda | H04N 25/772 |

FOREIGN PATENT DOCUMENTS

| | | |
|---|---|---|
| JP | 2017-005443 A | 1/2017 |
| JP | 2017-112596 A | 6/2017 |
| WO | 2015/170503 A1 | 11/2015 |

* cited by examiner

IMAGING APPARATUS AND CONTROL METHOD THEREFOR

CROSS REFERENCE TO RELATED APPLICATIONS

This application is a U.S. National Phase of International Patent Application No. PCT/JP2021/003902 filed on Feb. 3, 2021, which claims priority benefit of Japanese Patent Application No. JP 2020-061951 filed in the Japan Patent Office on Mar. 31, 2020. Each of the above-referenced applications is hereby incorporated herein by reference in its entirety.

TECHNICAL FIELD

The present feature relates to an imaging apparatus. The present feature more specifically relates to an imaging apparatus that carries out still image recording and moving image display simultaneously and a method for controlling the apparatus.

BACKGROUND ART

In a conventional imaging apparatus, a still image is recorded when the shutter release button is pressed, and a monitor image is displayed beforehand as a live view at the display. When image data from an image sensor is switched between still image recording and live-view display, live-view display is interrupted during still image recording. In order to solve the problem, it is useful to provide two streams of image data from the image sensor, one for still image recording and the other for live-view display. For example, an image sensor that outputs a focus image signal from phase difference pixels as a first stream and a main line pixel signal from normal pixels as a second stream has been proposed (see, for example, PTL 1).

CITATION LIST

Patent Literature

[PTL 1]
JP 2017-005443 A

SUMMARY

Technical Problem

According to the conventional art, a frame memory is provided to output the two streams independently from each other. However, according to the conventional art, writing and reading to and from the frame memory must be completed within one frame period, which can limit the frame rate.

The present feature was developed in view of the foregoing and it is an object of the present feature to improve the frame rate in an imaging apparatus that performs still image recording and moving image display simultaneously.

Solution to Problem

The present feature is directed to a solution to the problem and a first aspect thereof relates to an imaging apparatus including a pixel array having an arrangement of a plurality of pixels each including an internal memory and an exposure control unit that carries out first exposure control in which captured data obtained by performing exposure to all the plurality of pixels together is retained in the internal memories of the pixels and second exposure control in which captured data obtained by performing exposure to specific pixels of the plurality of pixels together is retained in the internal memories of the pixels, and a method for controlling the apparatus. This provides such a function that after all the pixels are exposed and captured together, specific pixels are exposed and captured, and the other pixels are maintained in the internal memories.

Also according to the first aspect, there may further be a column processing unit including a plurality of analog-digital converters which convert captured data retained in the internal memories of the plurality of pixels from analog signals into digital signals and a signal processing unit which outputs the captured signals converted into the digital signals as first and second streams having different frame rates from each other. This provides such a function that the specific pixels and the other pixels are output as discrete streams.

Also according to the first aspect, the first stream may be a signal sequence read out from the internal memories of the plurality of pixels over a plurality of frame periods. This provides such a function that the second stream has an improved frame rate.

Also according to the first aspect, the first stream may have a lower frame rate than the second stream and a higher image quality than the second stream. For example, the first stream may be an image signal sequence for recording a still image, and the second stream may be an image signal sequence for displaying a monitor image.

Also according to the first aspect, the exposure control unit may include a plurality of row control units each configured to control exposure of pixels corresponding to each pixel row address in the pixel array. In this case, the row control unit may be supplied, as an input, with a control signal for the second exposure control for the pixel row corresponding to the specific pixels. The row control unit may accept a control signal for the second exposure control when whether a pixel row corresponds to the specific pixels is previously set and the pixel row is set as the pixel row corresponding to the specific pixels.

Also according to the first aspect, the signal processing unit may include a frame buffer which retains the first stream read out from the internal memories of the plurality of pixels.

Also according to the first aspect, the internal memory may be a charge retaining type which retains captured data as charge or a voltage retaining type which retains captured data as voltage.

DESCRIPTION OF EMBODIMENTS

Hereinafter, a mode for carrying out the present feature (hereinafter referred to as an embodiment) will be described. The description will be given in the following order.
1. Configuration
2. Operation
<1. Configuration>
[Imaging Apparatus]

Figure 1:
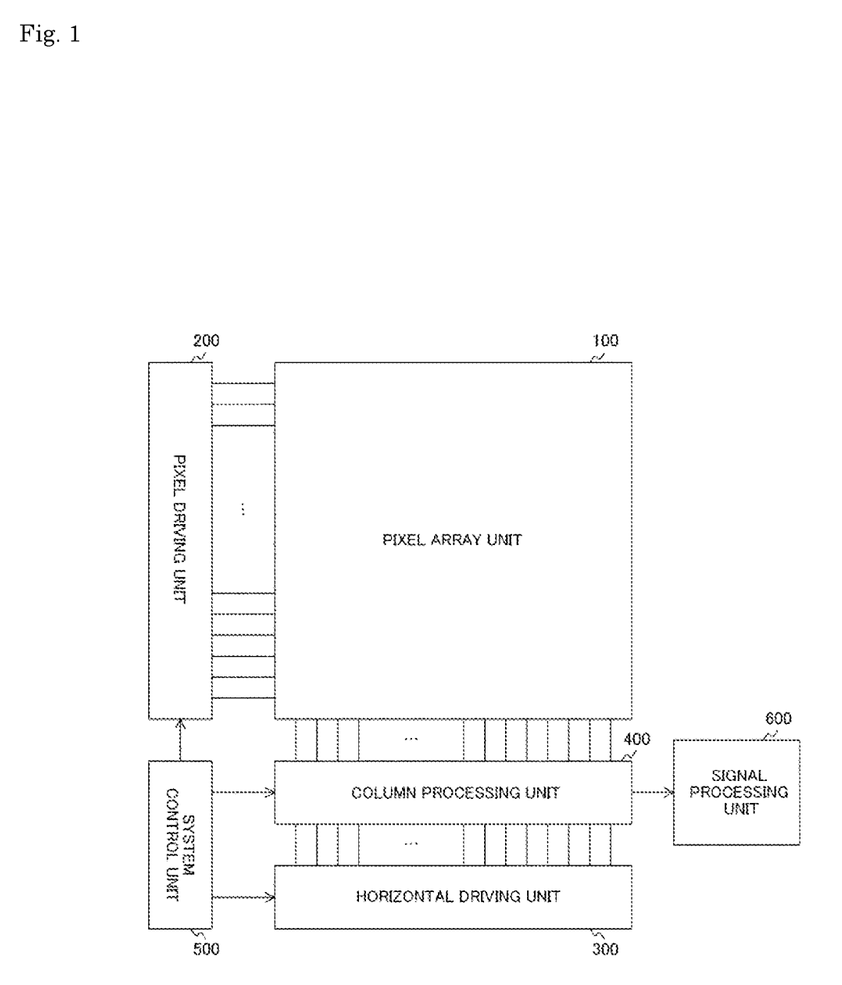
FIG. 1 is a diagram of an exemplary overall configuration of an imaging apparatus according to an embodiment of the present feature.

FIG. 1 is a diagram of an exemplary overall configuration of an imaging apparatus according to an embodiment of the present feature.

The imaging apparatus includes a pixel array unit 100, a pixel driving unit 200, a horizontal driving unit 300, a column processing unit 400, a system control unit 500, and a signal processing unit 600.

The pixel array unit 100 includes a plurality of pixels arranged in a two-dimensional matrix of rows and columns. The pixels in the pixel array unit 100 are driven and controlled by the pixel driving unit 200, so that an image is captured on the basis of incident light from an object and analog signals for the captured image data are output.

The pixel driving unit 200 controls driving of the vertically arranged columns of pixels in the pixel array unit 100 on a row basis according to control from the system control unit 500. The pixel driving unit 200 includes a mechanism which exposes only pixels corresponding to a moving image pixel address as will be described.

The horizontal driving unit 300 carries out such driving control according to control from the system control unit 500 that captured data from each of the pixels in the pixel array unit 100 is read out in the column direction and supplied to the column processing unit 400 and processed together in the horizontal direction.

The column processing unit 400 processes the captured data in the form of analog signals from the pixels in the pixel array unit 100 according to control from the system control unit 500. Specifically, analog-to-digital converters (AD converter) each configured to convert an analog signal into a digital signal are provided, and the captured data in the analog signal form is converted into a digital signal.

The system control unit 500 controls the entire imaging apparatus. In the timing in which a shutter release button pressing signal is received from the outside of the imaging circuit, the system control unit 500 causes all the pixels in the pixel array unit 100 to be exposed. Meanwhile, in the timing in which the shutter release button pressing signal is not received, only the pixels corresponding to a moving image pixel address are exposed.

The signal processing unit 600 performs prescribed signal processing on pixel data in the horizontal direction from the column processing unit 400 to produce two streams, one for recording still images and the other for live-view display of a monitor image.

[Pixel Structure]

Figure 2:
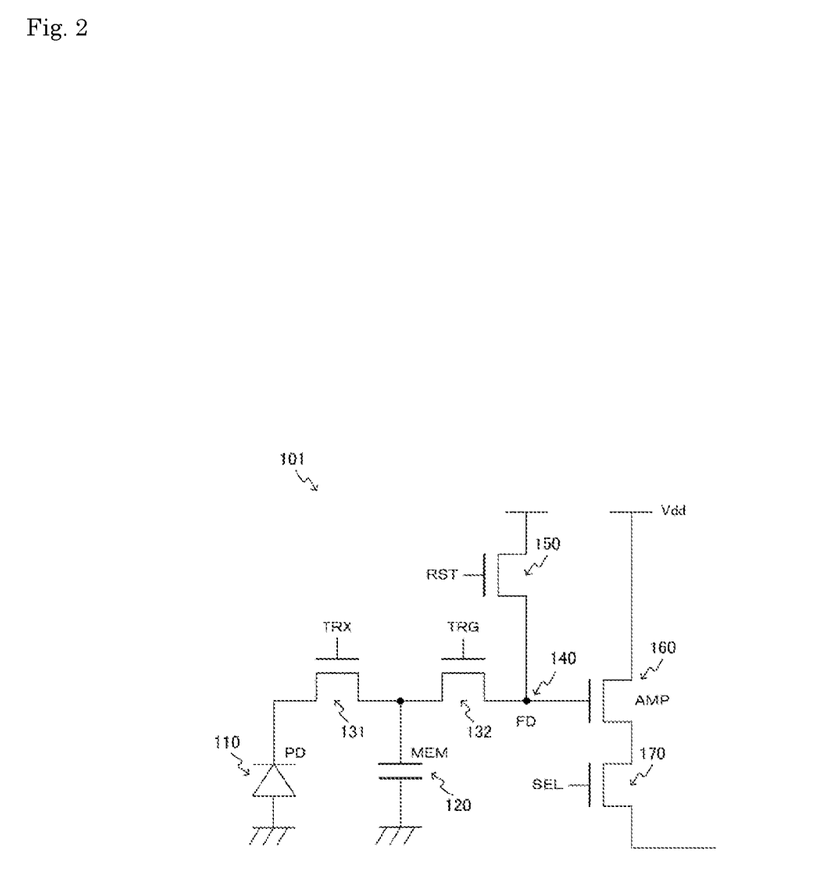
FIG. 2 is a diagram of a first exemplary configuration of each of the pixels in a pixel array unit 100 according to the embodiment of the present feature.

FIG. 2 is a diagram of a first exemplary configuration of each of the pixels in a pixel array unit 100 according to the embodiment of the present feature. The first exemplary configuration is an example of a pixel for a charge retention (Charge Domain) global shutter.

The pixel 101 in the first exemplary configuration includes a photoelectric conversion unit 110, a first charge transfer unit 131, a charge retention unit 120, a second charge transfer unit 132, a charge-voltage conversion unit 140, a charge reset unit 150, a signal amplification unit 160, and a pixel selection unit 170.

The photoelectric conversion unit 110 is a PN junction photo diode (PD) that generates and accumulates electric charge according to the incident light quantity during exposure.

The first charge transfer unit 131 transfers the charge accumulated in the photoelectric conversion unit 110 to the charge retention unit 120 in response to a first transfer signal TRX.

The charge retention unit 120 is an internal memory (MEM) that retains the charge accumulated in the photoelectric conversion unit 110 during exposure. The charge retention unit 120 allows the charge to be retained in the pixel 101, so that the global shutter for batch exposure can be used instead of a conventional rolling shutter for part-by-part exposure. The charge retention unit 120 is an example of an internal memory recited in the claims.

The second charge transfer unit 132 transfers the charge retained in the charge retention unit 120 to the charge-voltage conversion unit 140 in response to a second transfer signal TRG.

The charge-voltage conversion unit 140 is a floating diffusion (FD) capacitance formed between the drain of the second charge transfer unit 132 and the source of the charge reset unit 150. The charge-voltage conversion unit 140 accumulates the charge transferred from the second charge transfer unit 132.

The charge reset unit 150 resets the charge accumulated in the charge-voltage conversion unit 140 in response to a reset signal RST.

The signal amplification unit 160 amplifies the charge accumulated in the charge-voltage conversion unit 140 and outputs a pixel signal at a level corresponding to the charge. The signal amplification unit 160 has a gate electrode connected to the charge-voltage conversion unit 140 and a drain connected to the power supply voltage Vdd to serve as an input part for a readout circuit that reads out the charge obtained by photoelectric conversion in the photoelectric conversion unit 110 or a so-called source follower circuit.

The pixel selection unit 170 selects one of the pixels in the pixel array unit 100. The pixel selection unit 170 is connected between the source of the signal amplification unit 160 and a vertical signal line and has its gate electrode supplied with a selection signal SEL. When the selection signal SEL attains an H level, the pixel selection unit 170 attains a conductive state, and the pixel attains a selected state. When the pixel is in the selected state, the signal output from the signal amplification unit 160 is read out through the vertical signal line.

Figure 3:
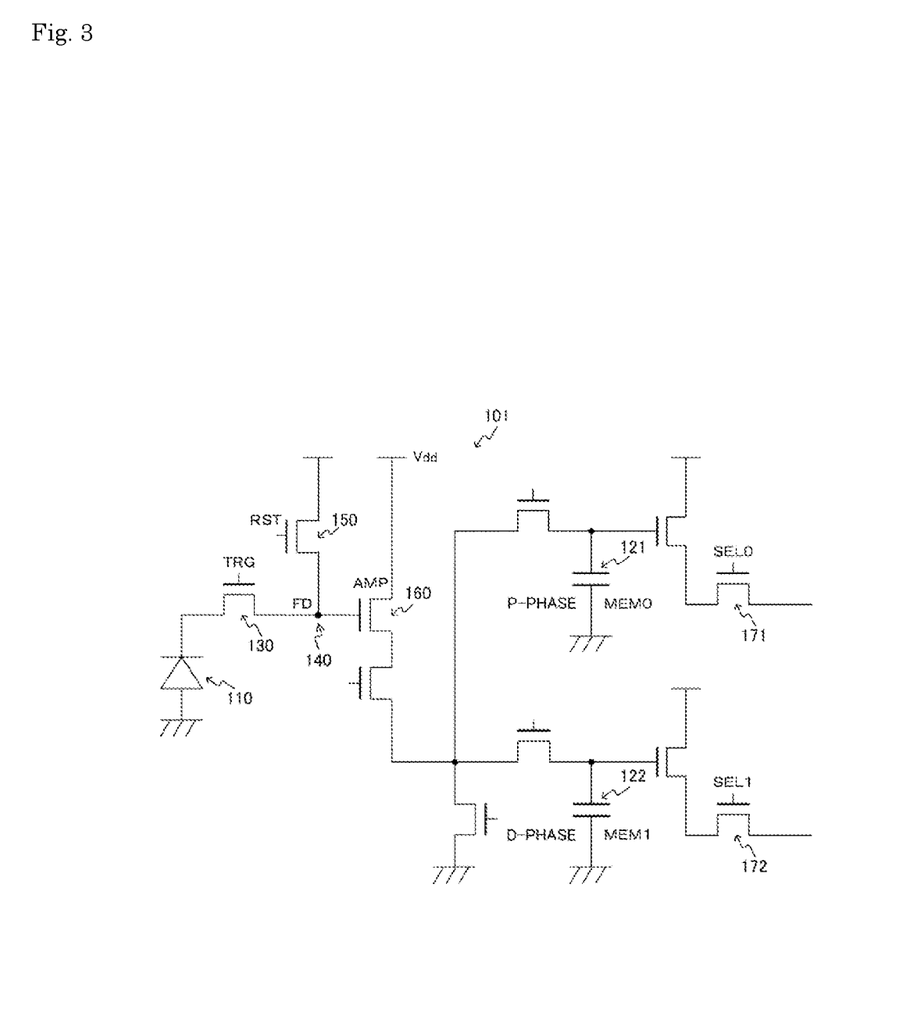
FIG. 3 is a diagram of a second exemplary configuration of each of the pixels in the pixel array unit 100 according to the embodiment of the present feature.

FIG. 3 is a diagram of a second exemplary configuration of each of the pixels in the pixel array unit 100 according to the embodiment of the present feature. The second exemplary configuration is an example of a pixel for a voltage-retaining type (Voltage Domain) global shutter.

The pixel 101 in the second exemplary configuration includes, as internal memories, a first voltage retention unit 121 and a second voltage retention unit 122. The first voltage retention unit 121 (MEM0) retains a P-phase (Pre-Charge phase) potential or a reset potential. The second voltage retention unit 122 (MEM1) retains a D-phase (Data phase) potential or a signal potential. The first voltage retention unit 121 and the second voltage retention unit 122 are examples of an internal memory recited in the claims.

The retained potential of the first voltage retention unit 121 is read out through the vertical signal line by supplying the pixel selection unit 171 with a selection signal SEL0 to cause the unit to attain a conductive state. The retained potential of the second voltage retention unit 122 is read out through the vertical signal line by supplying the pixel selection unit 172 with a selection signal SEL1 to cause the unit to attain a conductive state. In correlated double sampling (CDS), the noise component can be removed by subtracting the P-phase potential from the D-phase potential.

[AD Converters]

Figure 4:
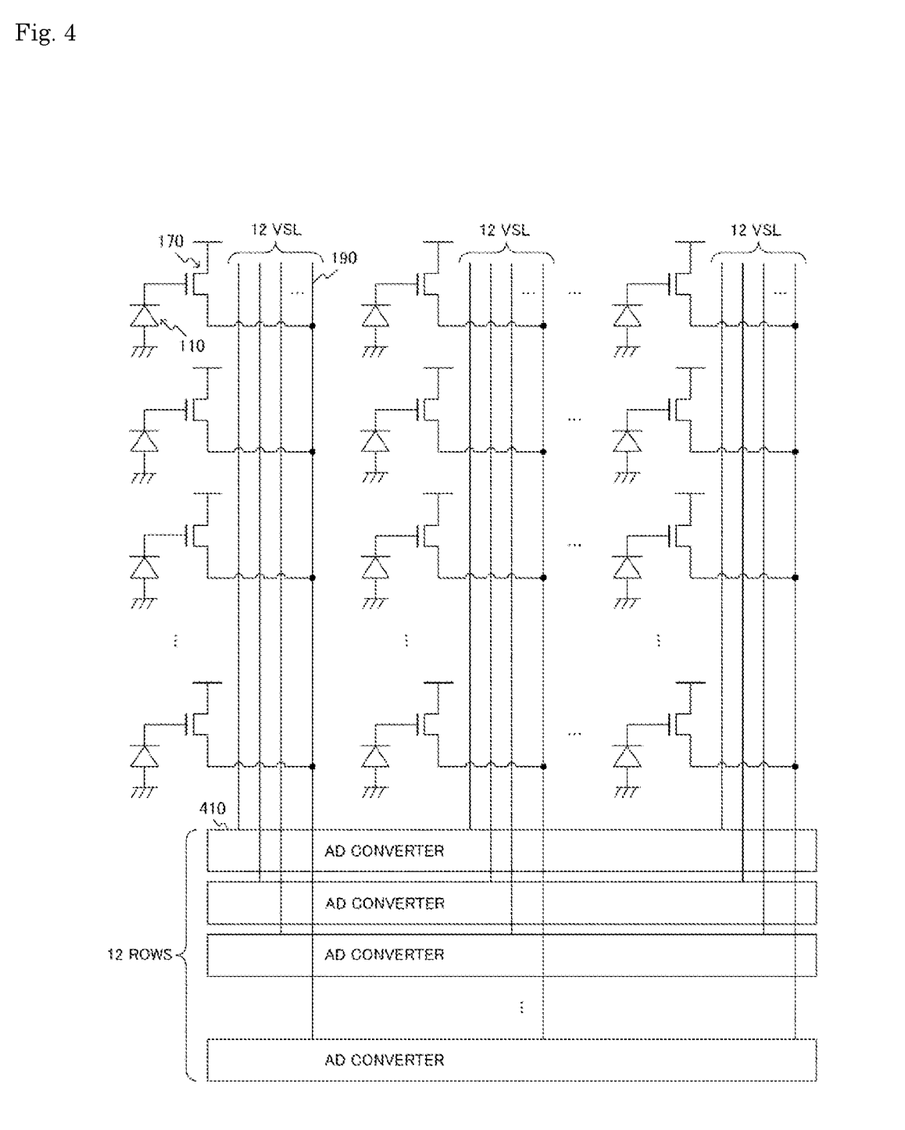
FIG. 4 is a diagram for illustrating an exemplary connection relation between pixels in the pixel array unit 100 and AD converters 410 according to the embodiment of the present feature.

FIG. 4 is a diagram for illustrating an exemplary connection relation between pixels in the pixel array unit 100 and AD converters 410 according to the embodiment of the present feature.

In this example, it is assumed that each column has 12 vertical signal lines (VSL) 190. Therefore, the column processing unit 400 includes AD converters 410 for 12 rows for each column. As a result, captured data for analog signals for 12 rows of pixels is simultaneously output as digital signals. The description of the following example is based on that the AD converters 410 for the 12 rows are provided, but the number of AD converters 410 is only an example and is not limited to the number.

According to the embodiment, when a shutter release button pressing signal is received and a stream for still image recording is output, captured data from all the pixels in the pixel array unit 100 is read out. In this case, the AD converter 410 for the 12 rows are used, and the speed can be 12 times as high as that when processing one row at a time. Also, the AD converters 410 each perform high-precision AD conversion (e.g., 14 bits).

In this case, out of the 12 rows read out for still image recording, for example, four rows are also used for live-view display of the monitor image. Therefore, the AD-converted high-precision image data may be output with a reduced precision (e.g., 12 bits) in the succeeding stage for the live-view display.

Meanwhile, when the shutter release button pressing signal is not received, four rows are AD-converted to output a stream for live-view display. In the case, the AD converters 410 each perform AD conversion with a precision which is not high (e.g., 12 bits). This allows the power consumption to be reduced.

[Image Processing System]

Figure 5:
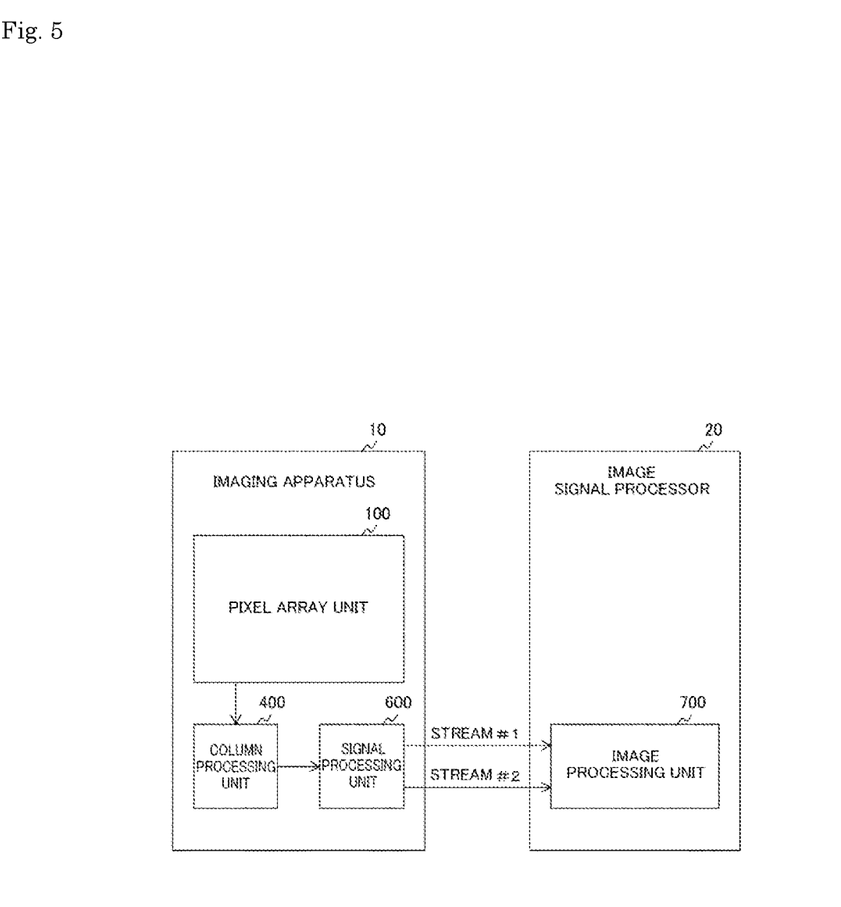
FIG. 5 is a diagram for illustrating an exemplary application of the imaging apparatus according to the embodiment of the present feature to an image processing system.

FIG. 5 is a diagram for illustrating an exemplary application of the imaging apparatus according to the embodiment of the present feature to an image processing system.

The image processing system includes an imaging apparatus 10 and an image signal processor 20. The imaging apparatus 10 is the imaging apparatus described above. Here, the elements other than the pixel array unit 100, the column processing unit 400, and the signal processing unit 600 are not shown.

The image signal processor (ISP) 20 performs prescribed image processing on captured data supplied from the imaging apparatus 10. The image signal processor 20 includes an image processing unit 700. The image processing unit 700 performs image processing such as interpolation processing and demosaicing on raw data from the imaging apparatus 10.

Two streams (image signal sequences) are supplied from the imaging apparatus 10 to the image signal processor 20. The first stream is a stream for still image recording, and the second stream is a stream for live-view display.

The stream for still image recording is generated when the shutter release button pressing signal is received. Meanwhile, the stream for live-view display is constantly generated during live-view display. Therefore, the frame rate of the stream for still image recording should be lower than that of the stream for live-view display.

It is intended that the stream for still image recording is recorded on a recording medium and is generally required to have a high image quality. Meanwhile, live-view display does not require such a high image quality. Therefore, the stream for still image recording should have a higher image quality than the stream for live-view display.

Figure 6A:
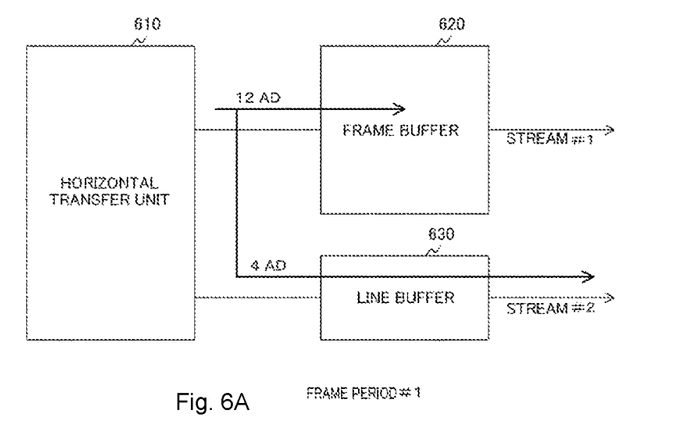
FIGS. 6A and 6B are diagrams for illustrating output examples of streams from the imaging apparatus according to the embodiment of the present feature.
Figure 6B:
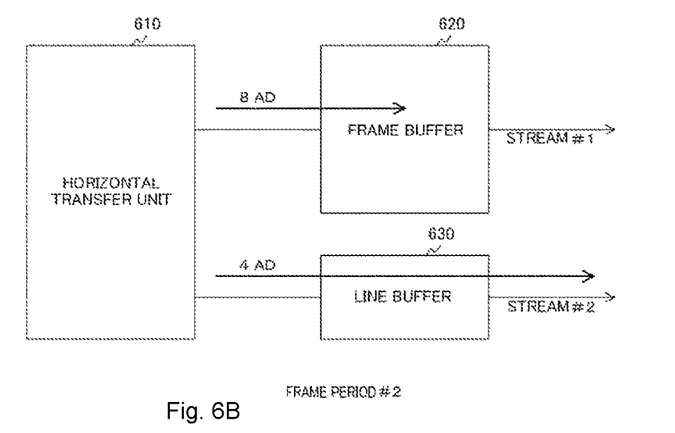

FIGS. 6A and 6B are diagrams for illustrating output examples of streams from the imaging apparatus according to the embodiment of the present feature.

Here, it is assumed that the signal processing unit 600 includes a horizontal transfer unit 610, a frame buffer 620, and a line buffer 630. However, the configuration including these elements is an example, and it is not necessarily required for the signal processing unit 600 to include the frame buffer 620 and the like.

In a frame period #1 in which the shutter release button pressing signal is received, captured data for pixels for 12 rows is simultaneously AD-converted and stored in the frame buffer 620 from the horizontal transfer unit 610. The image data stored in the frame buffer 620 subsequently becomes a stream #1 for still image recording when the captured data for one frame is available. In addition, data for four rows removed from AD-converted image data for the 12 rows is output as a stream #2 for live-view display through the line buffer 630.

In the next frame period #2, the image data for the pixels for the 12 rows is simultaneously AD-converted. However, of the AD converted data for the 12 rows, data for 8 rows is captured data for still image recording that was not accessed in the previous frame and is stored in the frame buffer 620. The data for the other four rows is output as the stream #2 for live-view display through the line buffer 630.

In this way, for live-view display, the removed captured data for the four rows is constantly output as the stream #2. Meanwhile, for still image recording, the captured data is stored in the frame buffer 620 over frame periods, and when the captured data for one frame becomes available, the data is output as the stream #1 for still image recording. Therefore, it is not necessary to complete writing and reading to and from the frame buffer within a frame period, and the frame rate can be improved.

Such reading of captured data over frame periods is allowed only because the internal memory (the charge retention unit 120 or the first voltage retention unit 121 and the second voltage retention unit 122) provided in the pixel 101 for the global shutter is used. In other words, all the pixels in the pixel array unit 100 are exposed during the frame period in the timing in which the shutter release button pressing signal is received, and during the other frame periods, only pixels corresponding to a pixel address for a moving image are exposed. This can prevent pixels other than those corresponding to the pixel address for the moving image from being reset, so that pixels for still image recording can be read out over frame periods.

[Pixel Driving Unit]

The control to expose only pixels corresponding to a pixel address for a moving image is performed in the pixel driving unit 200. Hereinafter, two exemplary configurations of the pixel driving unit 200 will be described.

Figure 7:
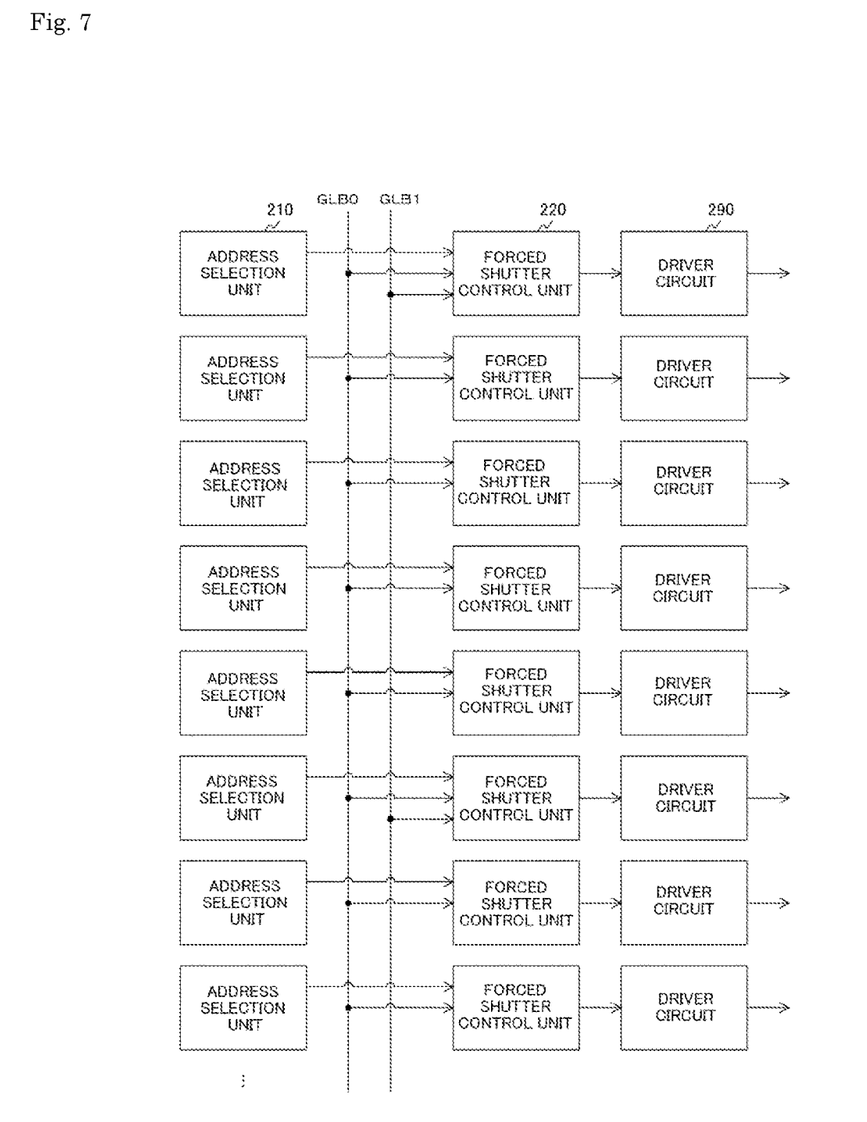
FIG. 7 is a diagram of a first exemplary configuration of a pixel driving unit 200 according to the embodiment of the present feature.

FIG. 7 is a diagram of a first exemplary configuration of the pixel driving unit 200 according to the embodiment of the present feature.

The first exemplary configuration of the pixel driving unit 200 includes an address selection unit 210, a forced shutter control unit 220, and a driver circuit 290 corresponding to each row in the pixel array unit 100. The address selection unit 210 selects an address for accessing the pixel array unit 100 on a row-basis. The forced shutter control unit 220 is configured to select and forcibly expose pixels 101 in all rows or a specific row of the pixel array unit 100. The driver circuit 290 is a driver configured to drive each row in the pixel array unit 100.

In general, the address selection unit 210 and the forced shutter control unit 220 can be operated at low voltage, but the driver circuit 290 is not suitable for low-voltage operation and has greater power consumption because of its long wiring length.

In addition to a control signal for individual access from the address selection unit 210, the forced shutter control unit 220 is supplied with global shutter control signals GLB0 and GLB1 for global shutter as inputs. The control signal GLB0 is a control signal as an instruction to perform forced exposure of pixels 101 in all the rows of the pixel array unit 100. Therefore, the control signal GLB0 is input to the forced shutter control units 220 in all the rows.

Meanwhile, the control signal GLB1 is a signal as an instruction to perform forced exposure of pixels 101 in a specific row of the pixel array unit 100. Therefore, the control signal GLB1 is input through wiring only to the forced shutter control unit 220 in the specific row. In this way, only the pixel address for live view set by hardwire is subjected to simultaneous shuttering.

The forced shutter control unit 220 is an example of a row control unit recited in the claims.

Figure 8:
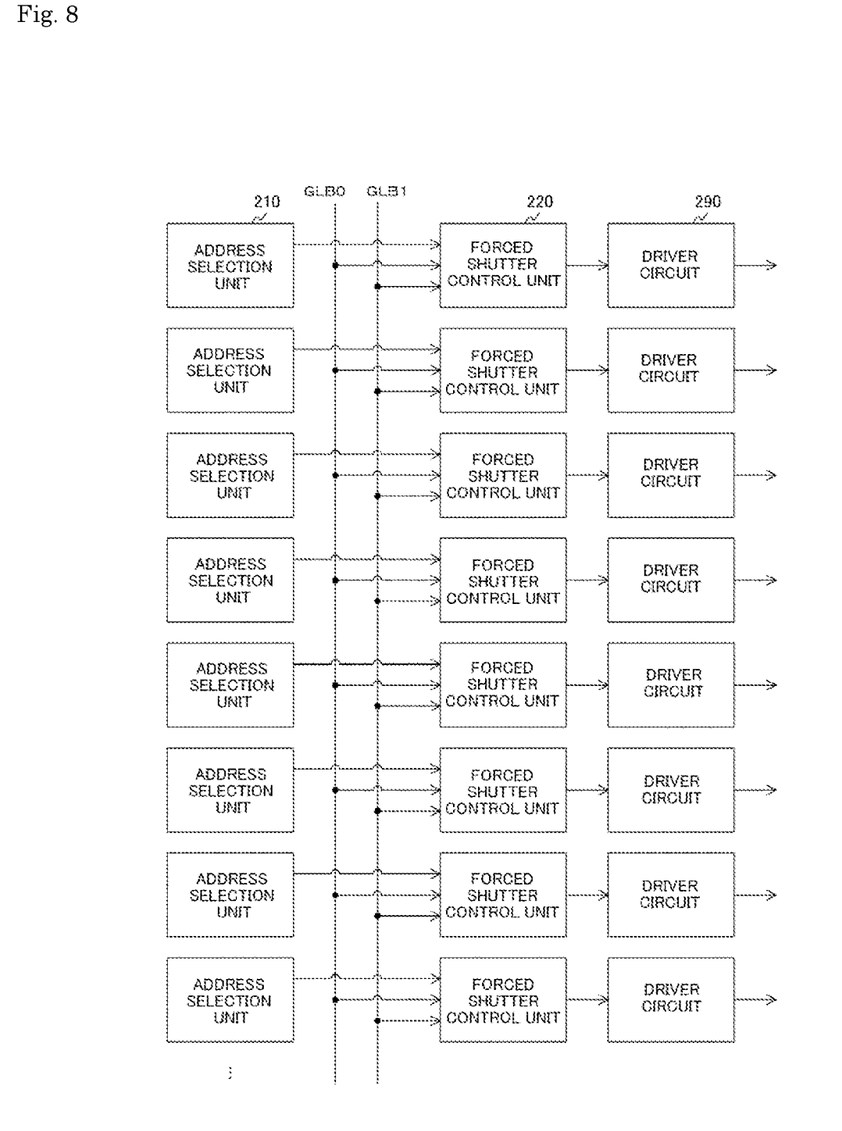
FIG. 8 is a diagram of a second exemplary configuration of the pixel driving unit 200 according to the embodiment of the present feature.

FIG. 8 is a cross-sectional view illustrating a configuration example of a pixel driving unit 200 according to the second embodiment of the present feature.

The second exemplary configuration of the pixel driving unit 200 includes an address selection unit 210, a forced shutter control unit 220, and a driver circuit 290 for each row of the pixel array unit 100 similarly to the first exemplary configuration. However, the control signal GLB1 as an instruction to perform forced exposure of pixels 101 in a specific row of the pixel array unit 100 is input to the forced shutter control units 220 in all the rows similarly to the control signal GLB0. Therefore, in the second exemplary configuration, the forced shutter control unit 220 holds a flag indicating whether to validate input of the control signal GLB1.

Figure 9:
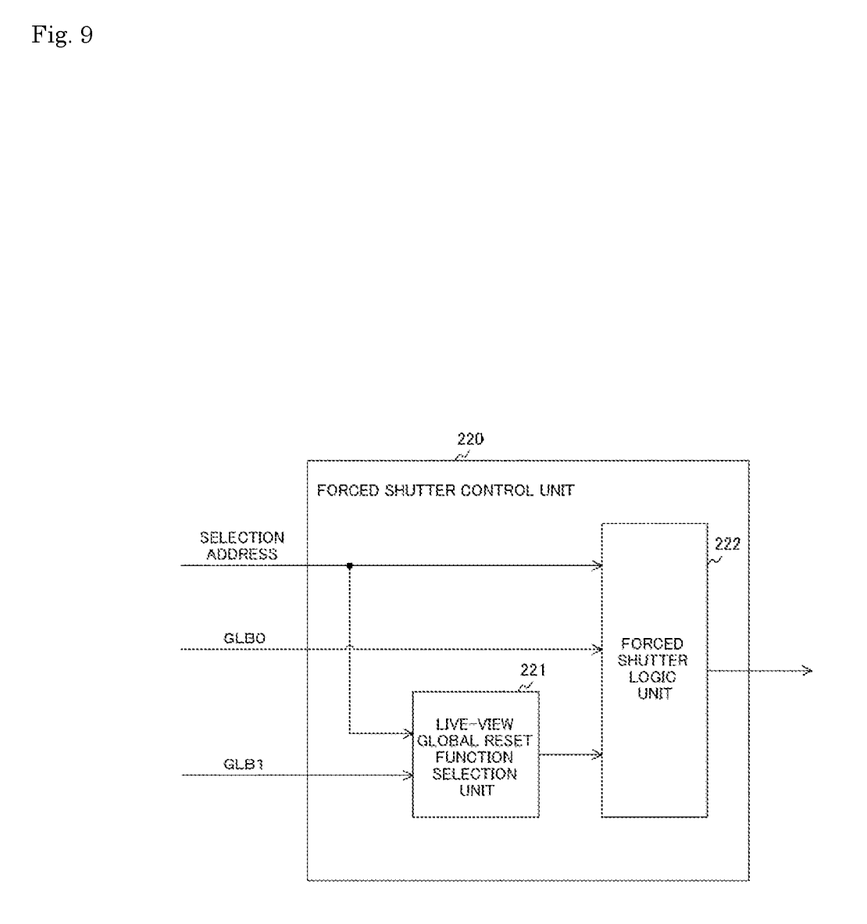
FIG. 9 is a diagram of an exemplary internal configuration of a forced shutter control unit 220 in the second exemplary configuration of the pixel driving unit 200 according to the embodiment of the present feature.

FIG. 9 is a diagram of an exemplary internal configuration of a forced shutter control unit 220 in the second exemplary configuration of the pixel driving unit 200 according to the embodiment of the present feature.

The forced shutter control unit 220 in the second exemplary configuration of the pixel driving unit 200 includes a live-view global reset function selection unit 221 and a forced shutter logic unit 222. The live-view global reset function selection unit 221 is configured to hold a flag indicating whether to validate input of the control signal GLB1 and selects whether to validate the live-view global reset function. The forced shutter logic unit 222 is a logic circuit configured to cause the driver circuit 290 to drive each row.

In other words, when the live-view global reset function selection unit 221 indicates "valid", the pixels 101 in the row are forcibly exposed in response to the control signal GLB1 as an instruction to perform forced exposure. Meanwhile, when the live-view global reset function selection unit 221 indicates "invalid", the pixels 101 in the row are not forcibly exposed, even when an instruction to perform forced exposure is issued from the control signal GLB1. Whether setting of "valid" or "invalid" by the live-view global reset function selection unit 221 can be set in advance for example through the system control unit 500. In this way, while uniform wiring is provided among the rows, only a previously set pixel address for live view can be subjected to simultaneous shuttering.

<2. Operation>

As described above, the imaging apparatus 10 operates by using the internal memory (the charge retention unit 120 or the first voltage retention unit 121 and the second voltage retention unit 122) provided in the pixel 101 in the pixel array unit 100 to read out captured data over frame periods. Hereinafter, the operation will be described.

Figure 10:
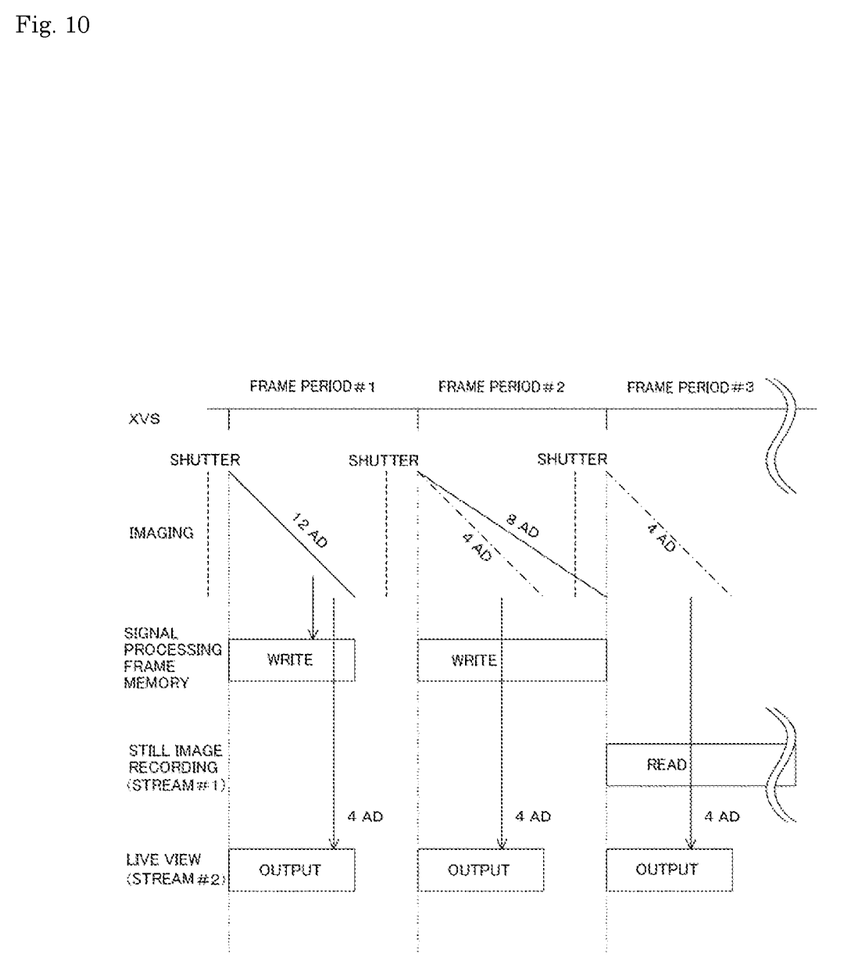
FIG. 10 is a diagram for illustrating exemplary operation timings for the imaging apparatus 10 according to the embodiment of the present feature.

FIG. 10 is a diagram for illustrating exemplary operation timings for the imaging apparatus 10 according to the embodiment of the present feature.

In the frame period #1 in which the shutter release button pressing signal is received, accessing is carried out in a thinned-out manner to include a pixel address to be used for live view display, and captured data for pixels for 12 rows is simultaneously AD-converted and stored in the frame buffer 620. In addition, data for four rows removed from AD-converted image data for the 12 rows is output as a stream #2 for live-view display through the line buffer 630.

In the frame period #1, exposure is performed simultaneously to all the pixels by the global shutter because there is no need to retain the previous captured data in the internal memory. As indicated by the vertical dotted line in the diagram, with the global shutter, the exposure is carried out at a time.

In the next frame period #2, the image data for the pixels for the 12 rows is simultaneously AD-converted. However, of the AD converted data for the 12 rows, data for 8 rows is captured data for still image recording that was not accessed in the previous frame and is stored in the frame buffer 620. The data for the other four rows is output as the stream #2 for live-view display through the line buffer 630.

In the frame period #2, only the pixels at the pixel address to be used for the live view display are exposed simultaneously by the global shutter so that the captured data held in the internal memory in the frame period #1 is not lost by resetting. In this way, the captured data for still image recording after the exposure in the frame period #1 can be stored in the frame buffer 620 while the stream #2 for live-view display is output at the same time. In the example, it is assumed that captured data for one frame is stored in the frame buffer 620 over the frame periods #1 and #2.

In the next frame period #3, the captured data for one frame stored in frame buffer 620 is output as the stream #1 for still image recording and supplied to the image signal processor 20 and the like in the succeeding stage.

In the frame period #3, captured data for pixels for four rows is simultaneously AD-converted. The data for the four rows is output as the stream #2 for live-view display through the line buffer 630.

Figure 11:
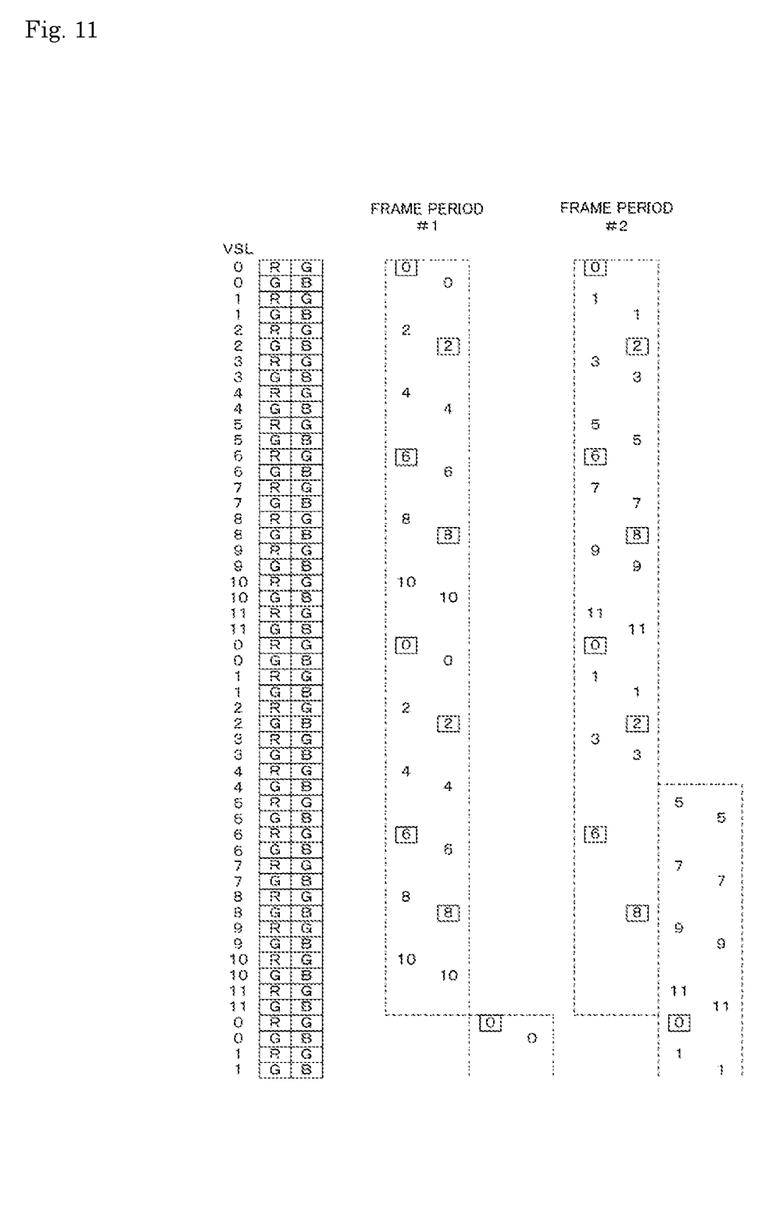
FIG. 11 is a diagram for illustrating examples of access along vertical signal lines 190 in the imaging apparatus 10 according to the embodiment of the present feature.

FIG. 11 is a diagram for illustrating examples of access along vertical signal lines 190 in the imaging apparatus 10 according to the embodiment of the present feature.

As described above, according to the embodiment, it is assumed that 12 vertical signal lines 190 are provided for each column and the AD converter 410 for the 12 rows is provided for each column. Therefore, the vertical signal lines 190 used for the pixel address for live-view display and the other vertical signal lines 190 used for the pixel address for still image recording must be controlled not to collide with each other.

In the shown example, in a Bayer array, R rows including R (red) pixels and B rows including B (blue) pixels are separated, and 12 vertical signal lines 190 are used for each. The framed numbers indicate the numbers assigned to the vertical signal lines 190 used for the pixel addresses for live-view display, and the other numbers indicate the numbers assigned to the vertical signal lines 190 used for the pixel addresses for still image recording.

It should be noted that the example is only an example of access, and other access patterns may be used.

As described above, according to the embodiment of the present feature, the pixel driving unit 200 performs global shutter exposure simultaneously only for the pixels at the pixel address used for live view display. In this way, the pixels for still image recording can be read over frame periods in the imaging apparatus 10 that performs still image recording without interrupting the live-view display, so that the frame rate can be improved. In other words, the frame rate can be increased for moving images for live-view display and the effect of PLS (Parasitic Light Sensitivity) can be reduced for still images.

The above embodiment has been described by way of illustrating an example of how to embody the present feature, and the matters according to the embodiment have a corresponding relationship with the invention specifying matters in the claims. Similarly, the invention specifying matters in the claims and the matters according to the embodiment of the present feature with the same names have a corresponding relationship with each other. However, the present feature is not limited by the embodiment and can be embodied by making various modifications to the embodiment without departing from the gist thereof.

Further, the processing procedures described in the embodiments described above may be construed as a method having such a series of procedures or may be construed as a program for causing a computer to execute the series of procedures or a recording medium storing the program. Examples of the recording medium may include a compact disc (CD), a MiniDisc (MD), a digital versatile disc (DVD), a memory card, and a Blu-ray (registered trademark) Disc.

The advantageous effects described herein are examples only and are not limited to the above, and there may be other advantageous effects.

The following configuration may be provided according to the present feature.

(1) An imaging apparatus including a pixel array having an arrangement of a plurality of pixels each including an internal memory and an exposure control unit that carries out first exposure control in which captured data obtained by performing exposure to all the plurality of pixels together is retained in the internal memories of the pixels and second exposure control in which captured data obtained by performing exposure to specific pixels of the plurality of pixels together is retained in the internal memories of the pixels.

(2) The imaging apparatus according to (1) further including a column processing unit including a plurality of analog-digital converters which convert captured data retained in the internal memories of the plurality of pixels from analog signals into digital signals and a signal processing unit which outputs the captured signals converted into the digital signals as first and second streams having different frame rates from each other.

(3) The imaging apparatus according to (2) in which the first stream is a signal sequence read out from the internal memories of the plurality of pixels over a plurality of frame periods.

(4) The imaging apparatus according to (2) or (3) in which the first stream has a lower frame rate than the second stream and a higher image quality than the second stream.

(5) The imaging apparatus according to any one of (2) to (4) in which the first stream is an image signal sequence for recording a still image, and the second stream is an image signal sequence for displaying a monitor image.

(6) The imaging apparatus according to any one of (2) to (5) in which the exposure control unit includes a plurality of row control units each configured to control exposure of pixels corresponding to each pixel row address in the pixel array.

(7) The imaging apparatus according to (6) in which the row control unit is supplied, as an input, with a control signal for the second exposure control for a pixel row corresponding to the specific pixels.

(8) The imaging apparatus according to (6) in which the row control unit accepts a control signal for the second exposure control when whether a pixel row corresponds to the specific pixels is previously set and the pixel row is set as the pixel row corresponding to the specific pixels.

(9) The imaging apparatus according to any one of (2) to (8) in which the signal processing unit comprises a frame buffer which retains the first stream read out from the internal memories of the plurality of pixels.

(10) The imaging apparatus according to any one of (1) to (9) in which the internal memory retains captured data as charge.

(11) The imaging apparatus according to any one of (1) to (9) in which the internal memory retains captured data as voltage.

(12) A method for controlling an imaging apparatus including a pixel array having an arrangement of a plurality of pixels each including an internal memory, the method including a first exposure control procedure in which captured data obtained by performing exposure to all the plurality of pixels together is retained in the internal memories of the pixels and a second exposure control procedure in which captured data obtained by performing exposure to specific pixels of the plurality of pixels together is retained in the internal memories of the pixels.

REFERENCE SIGNS LIST

10 Imaging apparatus
20 Image signal processor

100 Pixel array unit
101 Pixel
110 Photoelectric conversion unit
120 Charge retention unit
121, 122 Voltage retention unit
131, 132 Charge transfer unit
140 Charge-voltage conversion unit
150 Charge reset unit
160 Signal amplification unit
170, 171, 172 Pixel selection unit
190 Vertical signal line
200 Pixel driving unit
210 Address selection unit
220 Forced shutter control unit
221 Live-view global reset function selection unit
222 Forced shutter logic unit
290 Driver circuit
300 Horizontal driving unit
400 Column processing unit
410 AD converter
500 System control unit
600 Signal processing unit
610 Horizontal transfer unit
620 Frame buffer
630 Line buffer
700 Image processing unit

The invention claimed is:

1. An imaging apparatus, comprising:
a pixel array that includes a plurality of pixels, wherein each of the plurality of pixels includes memories;
an exposure control unit configured to execute first exposure control in which first captured data obtained by performing exposure to all the plurality of pixels is retained in the internal memories of the plurality of pixels and second exposure control in which second captured data obtained by performing exposure to specific pixels of the plurality of pixels is retained in the internal memories of the specific pixels;
a column processing unit including a plurality of analog-digital converters configured to:
convert the first captured data retained in the internal memories of the plurality of pixels into first digital signals; and
convert the second captured data retained in the internal memories of the specific pixels into second digital signals; and
a signal processing unit that includes a frame buffer and a line buffer, wherein
the frame buffer is configured to store the first digital signals and output the stored first digital signals as a first stream, and
the line buffer is configured to store the second digital signals and output the stored second digital signals as a second stream having a frame rate higher than a frame rate of the first stream.

2. The imaging apparatus according to claim 1, wherein the first stream is a signal sequence read out from the internal memories of the plurality of pixels over a plurality of frame periods.

3. The imaging apparatus according to claim 1, wherein the first stream has a higher image quality than the second stream.

4. The imaging apparatus according to claim 1, wherein the first stream is an image signal sequence for recording a still image, and
the second stream is an image signal sequence for displaying a monitor image.

5. The imaging apparatus according to claim 1, wherein the exposure control unit includes a plurality of row control units each configured to control exposure of a set of pixels of the plurality of pixels corresponding to each pixel row address in the pixel array.

6. The imaging apparatus according to claim 5, wherein a row control unit of the plurality of row control units is configured to receive, as an input, a control signal for the second exposure control for a pixel row corresponding to the specific pixels.

7. The imaging apparatus according to claim 6, wherein the row control unit is further configured to hold a flag indicating a validity of the control signal, and
the exposure control unit is further configured to execute the second exposure control based on the flag.

8. The imaging apparatus according to claim 5, wherein the row control unit is further configured to accept a control signal for the second exposure control in a case where a pixel row corresponding to the specific pixels is previously set and the pixel row is set as the pixel row corresponding to the specific pixels.

9. The imaging apparatus according to claim 1, wherein the internal memories are configured to retain the first captured data as charge.

10. The imaging apparatus according to claim 1, wherein the internal memories are configured to retain the first captured data as voltage.

11. A method for controlling an imaging apparatus comprising a pixel array that includes a plurality of pixels each including internal memories, the method comprising:
executing a first exposure control in which first captured data obtained by performing exposure to all the plurality of pixels is retained in the internal memories of the plurality of pixels;
executing a second exposure control in which second captured data obtained by performing exposure to specific pixels of the plurality of pixels is retained in the internal memories of the specific pixels;
converting, by analog-digital converters of the imaging apparatus, the first captured data retained in the internal memories of the plurality of pixels into first digital signals;
converting, by the analog-digital converters, the second captured data retained in the internal memories of the specific pixels into second digital signals;
storing, in a frame buffer of the imaging apparatus, the first digital signals;
outputting, by the frame buffer, the stored first digital signals as a first stream;
storing, in a line buffer of the imaging apparatus, the second digital signals; and
outputting, by the line buffer, the stored second digital signals as a second stream having a frame rate higher than a frame rate of the first stream.

* * * * *